(12) United States Patent
Kim et al.

(10) Patent No.: US 8,426,065 B2
(45) Date of Patent: Apr. 23, 2013

(54) ANODE ACTIVE MATERIAL FOR SECONDARY BATTERY

(75) Inventors: Ki Tae Kim, Daejeon (KR); Je Young Kim, Daejeon (KR); Dong Sub Jung, Daejeon (KR); Seung Tae Hong, Daejeon (KR); Young Sun Choi, Daejeon (KR)

(73) Assignee: LG Chem, Ltd. (KR)

( * ) Notice: Subject to any disclaimer, the term of this patent is extended or adjusted under 35 U.S.C. 154(b) by 79 days.

(21) Appl. No.: 13/142,463

(22) PCT Filed: Dec. 30, 2009

(86) PCT No.: PCT/KR2009/007985
§ 371 (c)(1),
(2), (4) Date: Aug. 8, 2011

(87) PCT Pub. No.: WO2010/077100
PCT Pub. Date: Jul. 8, 2010

(65) Prior Publication Data
US 2012/0037858 A1    Feb. 16, 2012

(30) Foreign Application Priority Data

Dec. 30, 2008 (KR) .................. 10-2008-0136721

(51) Int. Cl.
*H01M 4/134* (2010.01)
(52) U.S. Cl.
USPC .......... 429/218.1; 252/182.1; 252/521.3; 429/231.1; 429/231.8; 429/231.9; 429/231.95

(58) Field of Classification Search ............ 252/182.1, 252/521.3; 429/218.1, 231.1, 231.8, 231.9, 429/231.95
See application file for complete search history.

(56) References Cited

U.S. PATENT DOCUMENTS 8,071,238 B2 * 12/2011 Le ......................... 429/218.1

FOREIGN PATENT DOCUMENTS

| JP | 2006-164960 A | 6/2006 |
| JP | 4-344121 A | 10/2009 |
| KR | 20030041816 A | 5/2003 |
| KR | 20050012207 A | 1/2005 |
| KR | 20050032464 A | 4/2005 |
| KR | 100911799 | 10/2007 |

OTHER PUBLICATIONS

International Search Report, PCT/KR2009/007985, dated Aug. 17, 2010.

* cited by examiner

*Primary Examiner* — Mark Kopec
*Assistant Examiner* — Haidung Nguyen
(74) *Attorney, Agent, or Firm* — Lerner, David, Littenberg, Krumholz & Mentlik, LLP

(57) ABSTRACT

Disclosed is an anode active material including: a crystalline phase comprising Si and a Si-metal alloy; and an amorphous phase comprising Si and a Si-metal alloy, wherein the metal of the Si-metal alloy of the crystalline phase is the same as or different from the metal of the Si-metal alloy of the amorphous phase.

12 Claims, 3 Drawing Sheets

ANODE ACTIVE MATERIAL FOR SECONDARY BATTERY

CROSS REFERENCE TO RELATED APPLICATIONS

The present application is a national phase entry under 35 U.S.C. §371 of International Application No. PCT/KR2009/007985, filed Dec. 30, 2009, published in Korean, which claims priority from Korean Patent Application No. 10-2008-0136721, filed Dec. 30, 2008. The disclosures of said applications are incorporated by reference herein.

TECHNICAL FIELD

The present disclosure relates to an anode active material for a secondary battery exhibiting superior cycle characteristics, less volume expansion and high capacity.

BACKGROUND

Recently, with the development of mobile applications, high-capacity energy source is required. The lithium secondary battery is a representative example. In the currently used lithium secondary battery, carbonaceous materials are used as anode active material. The theoretical capacity of the carbonaceous material is 372 mAh/g. Since the capacity of the presently commercially available batteries is around 360 mAh/g, it has almost reached the theoretical capacity limit. Accordingly, for preparation of high-capacity batteries, development of a new material capable of replacing the carbonaceous anode active material is necessary.

Representative materials as the new high-capacity anode active material include metallic materials such as silicon (Si), tin (Sn), etc. that allow intercalation/deintercalation of lithium (Li) via alloying reactions with lithium. However, when a metal such as silicon (Si), tin (Sn), etc. alone is used as the anode active material, volume change during charging-discharging is very large, as much as 300-400%, resulting in separation from the electrode and significant deterioration of cycle characteristics. Therefore, it is hard to be actually applied in batteries.

To overcome this problem, alloys of silicon (Si) or tin (Sn) with other metals (i.e., Si-M alloys and Sn-M alloys, M is a metal element) have been studied by many researchers. These alloy-type materials are known to form a single-element phase of silicon (Si), tin (Sn), etc. that can bind with lithium, a metal silicide ($M_xSi_y$) phase that does not bind with lithium, a metal-tin (Sn) alloy ($M_xSn_y$) phase, or the like. The single phase of silicon (Si), tin (Sn), etc. is capable of binding with and release from lithium during charging-discharging and, thus, provides battery capacity through electrochemical reactions. The metal silicide ($M_xSi_y$) phase and the metal-tin (Sn) alloy ($M_xSn_y$) phase do not bind with lithium but are known to suppress volume expansion of the anode active material by suppressing the volume change of the single phase of silicon (Si), tin (Sn), etc.

In this regard, in order to control electric capacity and cycle characteristics, the phases of the anode active material have been divided into a phase mainly essentially of Si and a phase mainly consisting of Si-metal alloy, and the ratio of the phases (Japanese Patent Laid-Open No. 2006-164960), or the particle size of the phases (Japanese Patent No. 4344121, Korean Patent No. 911799) have been controlled.

However, in spite of these efforts, the electric capacity and cycle characteristics are not satisfactorily controlled. Accordingly, there is a need of an anode active material allowing a better control of these properties.

SUMMARY

Although there have been efforts to divide a Si phase and a Si-metal alloy and control their ratio, a material including both a crystalline phase and an amorphous phase of Si and Si-metal alloy has never been reported.

The inventors of the present disclosure have found out that a Si-metal alloy used to suppress volume expansion of an anode active material exists as a crystalline phase as well as an amorphous phase and that the Si single phase existing separately from the Si-metal alloy contributes to electric capacity even though it is an amorphous phase.

Conventionally, it was thought that the Si contributing to electric capacity exists only as a crystalline phase and that an amorphous phase is composed of Si-metal alloy and thus cannot contribute to electric capacity. Accordingly, although there have been attempts to control the ratio of the Si phase and the Si-metal alloy or particle size thereof to improve electric capacity and cycle characteristics of a battery, no attempt has been made to control the ratio of the crystalline phase and the amorphous phase. However, according to the researches performed by the inventors of the present disclosure, the electric capacity and cycle characteristics cannot be improved sufficiently with the conventional methods, since the Si existing in the amorphous phase also contributes to the electric capacity.

In a general aspect, the present disclosure provides an anode active material including: a crystalline phase comprising Si and a Si-metal alloy; and an amorphous phase comprising Si and a Si-metal alloy, wherein the metal of the Si-metal alloy of the crystalline phase is the same as or different from the metal of the Si-metal alloy of the amorphous phase.

In another general aspect, the present further provides an electrode including the anode active material, and a lithium secondary battery including the electrode. In another general aspect, the present disclosure further provides an electrode including the anode active material as well as a carbonaceous anode active material, and a lithium secondary battery including the electrode.

Other features and aspects will be apparent from the following detailed description, the drawings, and the claims.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Figure 1:
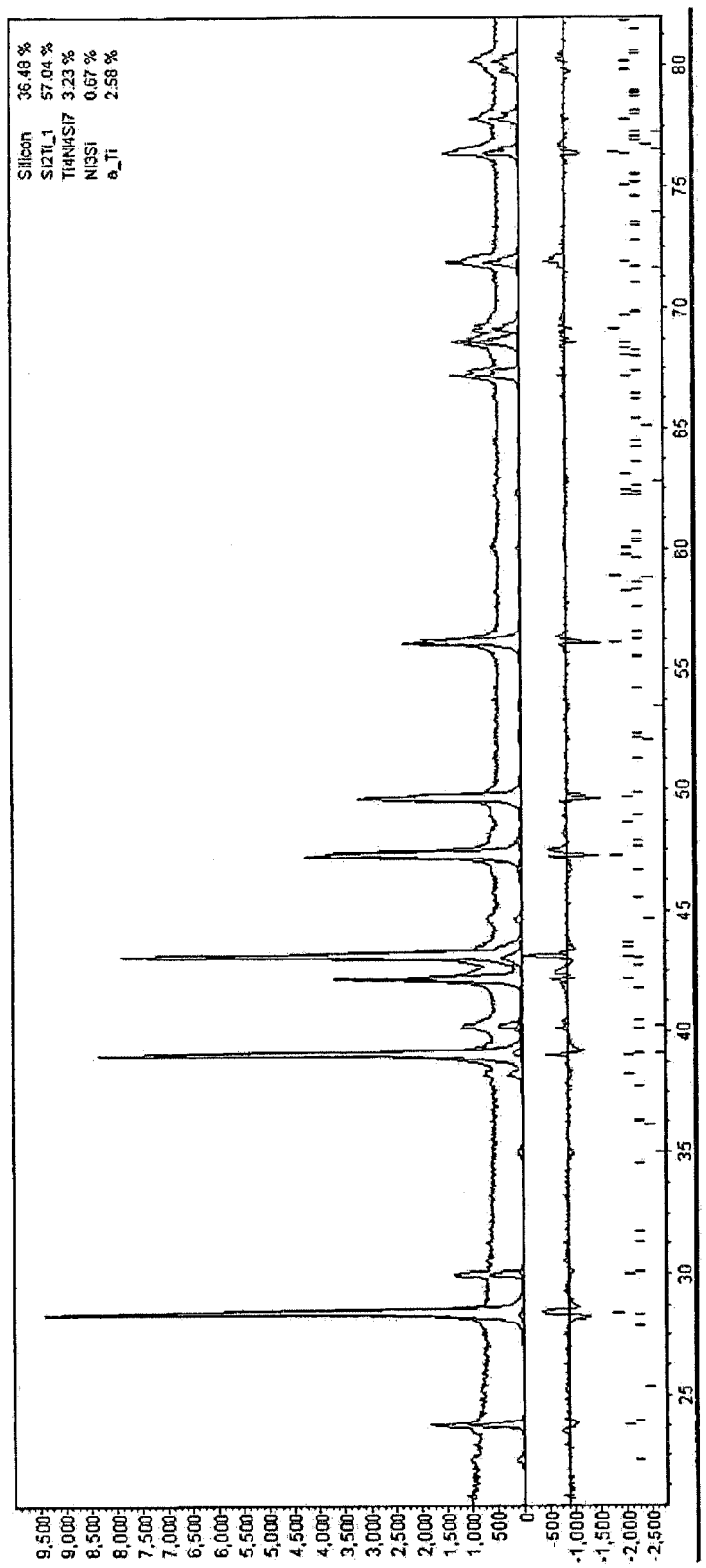
FIG. 1 shows an X-ray diffraction (XRD)-Rietveld refinement result of a Si—Ni—Ti alloy (Composition, weight ratio and preparation method are described in Example 1)

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of the example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

The present disclosure provides an anode active material including: a crystalline phase comprising Si and a Si-metal alloy; and an amorphous phase comprising Si and a Si-metal alloy.

In the anode active material, the metal of the Si-metal alloy of the crystalline phase may be the same as or different from the metal of the Si-metal alloy of the amorphous phase.

In the Si-metal alloy of the crystalline phase and the Si-metal alloy of the amorphous phase, the metal may comprise one or more metal species. Preferably, it may comprise two or more metal species. That is to say, the alloy may be in the form of Si-A, Si-A-B, Si-A-B—C, and so forth (wherein A, B and C denote different metals).

The metal may be Ca, Sc, Ti, V, Cr, Mn, Fe, Co, Ni, Cu, Zn, Sr, Y, Zr, Nb, Ba, Lu, Hf, Ta or lanthanides. Preferably, Ca, Co, Ni, Mn, Ti, Zr, Co, Ni, Fe or rare earth elements (Sc, Y and lanthanides) may be used among them.

In case of a Si-A type alloy comprising one metal in addition to Si, the metal may be selected from Co, Ni, Mn and Ti.

In case of a Si-A-B type alloy comprising two metals in addition to Si, A may be a metal selected from Ti and Zr, and B may be a metal selected from Co, Ni and Fe.

In addition, one or more metal selected from rare earth elements may be mixed with a metal selected from Co, Ni and Fe. In this case, the rare earth element may be a mixed rare earth element, preferably misch metal.

In the present disclosure, the anode active material comprises a combination of the crystalline phase and the amorphous phase. Both the crystalline phase and the amorphous phase comprise a material allowing repetitive intercalation and deintercalation of Li electrochemically and a material incapable of binding with Li electrochemically. The crystalline phase comprises Si and a Si-metal alloy. The crystalline phase may further comprise other metals. The amorphous phase also comprises Si and a Si-metal alloy. The amorphous may further comprise other metals.

In the present disclosure, Si and the Si-metal alloy are present both in the crystalline phase and the amorphous phase, and the ratio of the two phases is controlled to minimize volume expansion and maximize cycle characteristics. The ratio of the crystalline phase and the amorphous phase may be controlled by varying the kind and amount of the metal, the method of preparing the alloy, or the like. The amount of the amorphous phase may be controlled by ball milling, which is a mechanical alloying method. For example, the amount of the amorphous phase may be increased by selecting a composition allowing easy formation of the amorphous phase, increasing cooling speed during quenching, or increasing ball milling time, ball-to-alloy ratio, linear speed of the milling machine, or the like.

In the anode active material of the present disclosure, the amount of the amorphous phase may be 30 wt % or more based on the crystalline phase and the amorphous phase combined. The higher the content of the amorphous phase, the better.

The source material for preparing the anode active material is not particularly limited in form as long as the desired composition can be achieved. For example, the source material may be in the form of element, alloy, solid solution, intermetallic compound, or the like.

The method for preparing the anode active material according to the present disclosure is not particularly limited as long as a uniform mixture of the crystalline phase and the amorphous phase can be obtained. For example, melt spinning whereby a composition comprising Si is melted and then quenched, strip casting, atomization, or the like may be employed. In addition, direct cast-rolling, spray foaming, gas spraying, wet spraying, or the like may also be employed. Thus prepared alloy is pulverized to prepare a metal powder comprising Si. The resulting metal powder is mechanically ground to prepare the anode active material. Preferably, the particle size may be from 1 µm to 50 µm.

The resultant alloy phase may be treated by mechanical alloying to obtain the anode active material with a desired ratio of the crystalline phase and the amorphous phase.

The present disclosure also provides an electrode comprising the anode active material, and a lithium secondary battery comprising the electrode. The present disclosure further provides an electrode comprising the anode active material as well as a carbonaceous anode active material, and a lithium secondary battery comprising the electrode.

The anode active material may be used to prepare an electrode. The electrode may be prepared by mixing the metal powder with a conducting agent and a binder. The binder may be polyvinylidene fluoride (PVDF) or any other binder as long as the electrode can be formed. For example, polyethylene, polypropylene, polytetrafluoroethylene, styrene-butadiene rubber, or the like may be used.

After the binder is dissolved in a solvent such as NMP, the metal powder and the conducting agent are added together to form a homogeneous slurry. The conducting agent may be acetylene black. However, other conducting agents such as artificial graphite, carbon fiber, carbon nanotube (CNT), amorphous carbon, etc. may be used as long as the conductivity of the electrode can be ensured.

With the previously known Rietveld refinement by X-ray diffraction (XRD) patterns, it is difficult to accurately measure the amount of the amorphous phase in the anode active material of the present disclosure. It is because although the Rietveld refinement gives information about the exact content of the crystalline phase it does not inform the content of the amorphous phase.

Thus, in the present disclosure, a method of mixing the active material with a predetermined amount of a known standard material, performing XRD-Rietveld refinement to calculate the volume ratio of respective phases, and calculating the contents of the phases from that of the standard material. This method is called spiking.

Details are as follows.

<XRD-Rietveld Refinement>

XRD-Rietveld refinement result of a Si—Ni—Ti alloy (Composition, weight ratio and preparation method are described in Example 1) is shown in FIG. 1. Based on the result, the contents of respective phases are calculated as follows.

TABLE 1

| Phases | wt % |
|---|---|
| Si | 36.5 |
| $Si_2Ti$ | 57 |
| $Ti_4Ni_4Si_7$ | 3.23 |
| $Ni_3Si$ | 0.67 |
| a-Ti | 2.58 |

From the content of Si in the alloy, 36.5 wt %, the electric capacity is calculated as 1315 mAh/g. However, the experimentally measured electric capacity of the alloy is 1100 mAh/g, much smaller than the theoretical value. This shows that the amount of Si participating in the reaction cannot be exactly determined through simple XRD-Rietveld refinement.

<Spiking>

Figure 2:
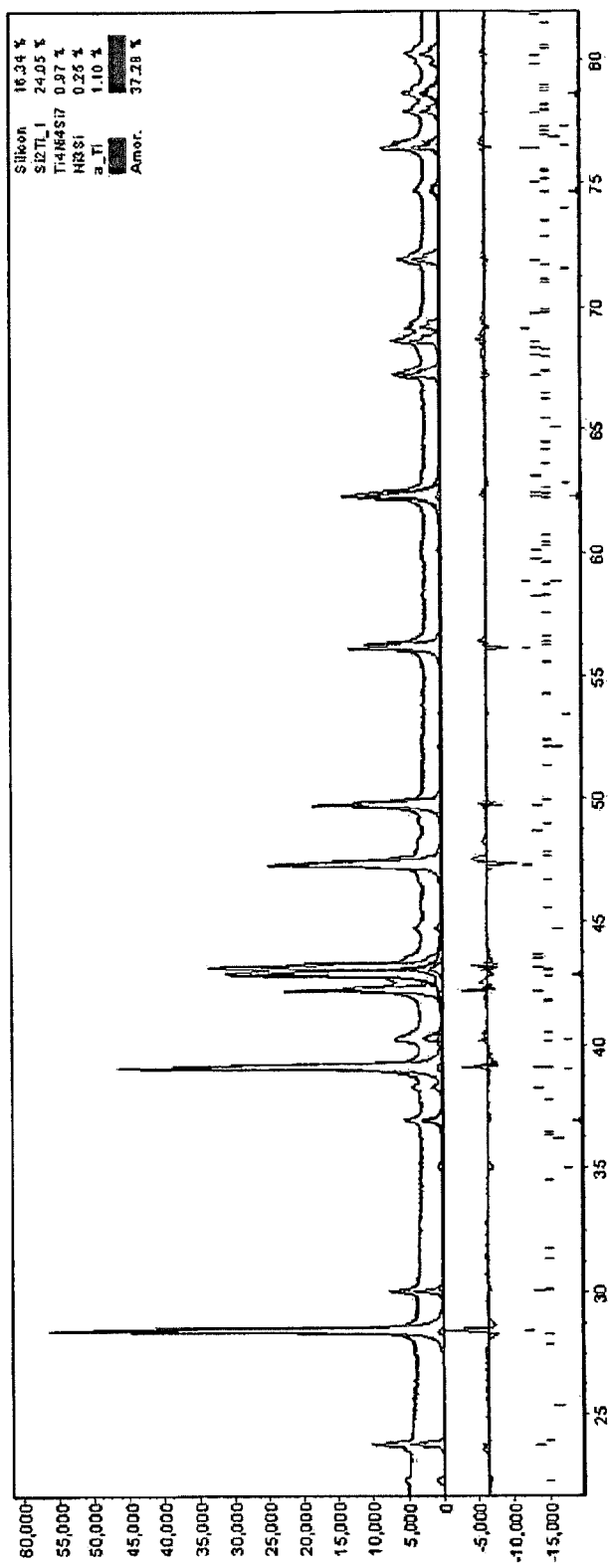
FIG. 2 shows an XRD-Rietveld refinement result of the alloy of FIG. 1 after adding 20% of MgO to mix the anode active material with MgO at a weight ratio of 8:2.

XRD-Rietveld refinement result of the alloy of FIG. 1 after adding 20% of MgO with excellent crystallinity and having XRD peaks not overlapping with those of the observed peaks, to mix the anode active material with MgO at a weight ratio of 8:2 is shown in FIG. 2. Based on the result, the contents of respective phases are calculated as follows.

TABLE 2

| Phases | wt % (with MgO) | wt % (without MgO) |
|---|---|---|
| Si | 16.3 | 20.4 |
| $Si_2Ti$ | 24.1 | 30.1 |
| $Ti_4Ni_4Si_7$ | 1.0 | 1.2 |
| $Ni_3Si$ | 0.3 | 0.3 |
| a-Ti | 1.1 | 1.4 |
| MgO | 20.0 | — |
| Amorphous | 37.3 | 46.6 |

When MgO is added, the amount of Si in the alloy is 16.3 wt % and that of the amorphous phase is 37.3 wt %. After removal of the standard material MgO, the amount of Si is calculated as 20.4 wt % and that of the amorphous phase is calculated as 46.6% wt %.

From the content of Si, 20.4 wt %, obtained by the spiking method, the electric capacity is calculated as 735 mAh/g. This is smaller than the experimentally measured value 1100 mAh/g by 365 mAh/g. It suggests that the Si included in the amorphous phase also contributes to the electric capacity.

Accordingly, it can be seen that Si and the Si-metal alloy are included not only in the crystalline phase but also in the amorphous phase. Further, it can be seen that when the crystalline phase and the amorphous phase exist together, both the crystalline phase and the amorphous phase include Si and the Si-metal alloy. Accordingly, it can be seen that both the crystalline phase and the amorphous phase contribute to electric capacity.

EXAMPLES

The examples and experiments will now be described. The following examples and experiments are for illustrative purposes only and not intended to limit the scope of this disclosure.

Example 1

1. Preparation of Anode Active Material

After mixing Si, Ni and Ti at a weight ratio of 60:5:35, a metal ribbon was prepared by melt spinning. The melt spinning was performed using a carbon crucible under a non-oxidizing inert atmosphere by injecting argon gas. The prepared metal ribbon was crushed manually in a mortar to produce a metal powder, which was sieved so that the particle size was not greater than 38 µm.

2. Phase Analysis by XRD and Spiking

The phases of the metal powder were analyzed by XRD. The Bruker AXS D4 Endeavor XRD analyzer, wavelength of 1.94 Å (Fe K α), and the LynxEye position sensitive detector were used.

Spiking analysis was performed to accurately analyze the ratio of the crystalline phase and the amorphous phase. The metal powder prepared above was uniformly mixed with 20% of MgO in a mortar and XRD measurement was made in the same manner as described above. Then, Rietveld refinement was carried out to accurately determine the fraction of the crystalline phase and MgO in the material. From the result, the fraction of the amorphous phase was calculated.

3. Preparation of Electrode and Battery

An electrode was prepared using the anode active material prepared above. The electrode was prepared by mixing the metal powder with a conducting agent and a binder. PVDF was used as the binder. After dissolving PVDF in NMP, the metal powder and the conducting agent were added together to prepare a homogeneous slurry. For the conducting agent, acetylene black was used. The weight ratio of the metal powder, the conducting agent and the binder in the electrode slurry was 80:10:10. The prepared slurry was applied well on a copper foil and then dried at 130° C. under a vacuum atmosphere for 4 hours.

Then, a coin half cell was prepared using the electrode and metallic Li. For the preparation of the coin cell, an electrolyte comprising 1 M $LiPF_6$ dissolved in a mixture of ethylene carbonate and diethyl carbonate (3:7) was used. A separator was placed between the metallic Li and the electrode.

4. Evaluation of Battery Performance (Electric Capacity, Cycle Characteristics and Volume Expansion)

Electric capacity and cycle characteristics of the anode active material were evaluated using the prepared coin cell.

After charging for 50 cycles, the coin cell was disassembled and the change in thickness was measured.

Examples 2-5

The ratio of the crystalline phase and the amorphous phase of the metal powder prepared in Example 1 was varied by ball milling (using SPEX MILL 8000). The ball milling was performed for 30 hours (Example 2), 60 hours (Example 3), 90 hours (Example 4) or 120 hours (Example 5) after adding stainless steel metal balls and the metal powder at a weight ratio of 15:1 in a stainless steel container. During the ball milling, argon was injected into the stainless steel container to provide an inert atmosphere.

After the ball milling, XRD analysis was performed in the same manner as in Example 1 to analyze the crystal structure. Also, a coin half cell was prepared in the same manner as in Example 1 and then the battery performance was evaluated.

Comparative Example 1

Metal mass was prepared in the same manner as in Examples 1-5 except that the metal material was melted by melt spinning and then annealed slowly in the air. The prepared metal mass was crushed manually in a mortar to produce a metal powder, which was sieved so that the particle size was not greater than 38 µm. The metal mass had a relatively higher ratio of the crystalline phase than Examples 1-5. Phase analysis and battery performance evaluation were carried out in the same manner as in Example 1.

The result of phase analysis and battery performance evaluation for Examples 1-5 and Comparative Example 1 is summarized in Table 3.

TABLE 3

| | Ratio of amorphous phase | Electric capacity | Maintenance of capacity after 50 cycles* | Thickness increase after 50 cycles** |
|---|---|---|---|---|
| Ex. 1 | 46.6% | 843 mAh/g | 60% | 257% |
| Ex. 2 | 75% | 835 mAh/g | 65% | 246% |
| Ex. 3 | 81% | 830 mAh/g | 67% | 233% |
| Ex. 4 | 89% | 820 mAh/g | 68% | 211% |
| Ex. 5 | 90% | 816 mAh/g | 75% | 182% |
| Comp. Ex. 1 | 15% | 875 mAh/g | 5% | 370% |

*= (Discharge capacity after 50 cycles/Discharge capacity after 1 cycle) × 100
**= (Thickness after 50 cycles-charging/Thickness before 1 cycle-charging) × 100

The contents of the crystalline and amorphous phases were determined by spiking. The spiking analysis of Example 1 was given earlier.

Evaluation Result:

In Examples 1-5, the ratio of the amorphous phase was 40% or greater. The electric capacity was superior (816-843 mAh/g) to carbonaceous material (360 mAh/g) by 2 times or more. Also, maintenance of capacity (60-75%) was higher and volume expansion (182-257%) was less after 50 cycles. In particular, as the ball milling proceeded, i.e. as the ratio of the amorphous phase increased, the electric capacity was decreased (from 843 mAh/g to 816 mAh/g), but maintenance of capacity was improved (from 60% to 75%) and volume expansion was decreased (from 257% to 182%) after 50 cycles.

In contrast, in Comparative Example 1, the crystalline phase was the majority (amorphous 15%, crystalline 85%). Although the electric capacity was superior (875 mAh/g), maintenance of capacity (5%) was very low and volume expansion was very large (370%) after 50 cycles.

Accordingly, it can be seen that as the ratio of the amorphous phase increases, the cycle characteristics become satisfactory and the volume expansion becomes controllable.

Figure 3:
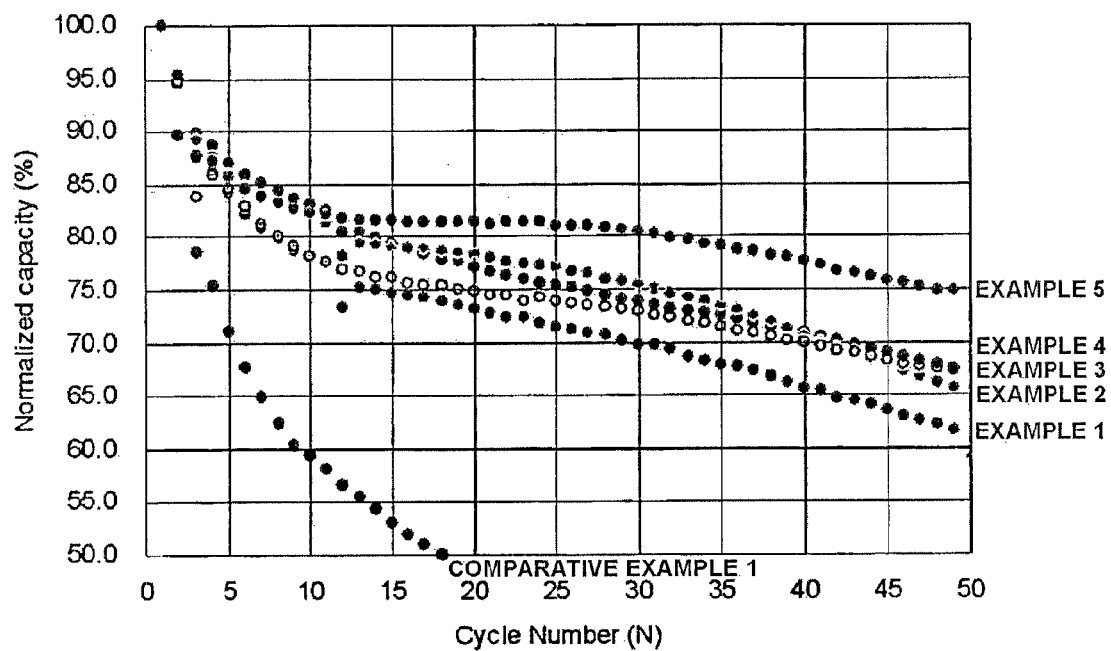
FIG. 3 shows cycle characteristics of the anode active materials of Examples 1-5 and Comparative Example 1.

FIG. 3 shows the cycle characteristics of Examples 1-5 and Comparative Example 1. As seen from FIG. 3, Examples 1-5 with larger ratio of the amorphous phase show better cycle characteristics than Comparative Example 1 with larger ratio of the crystalline phase. Among Examples 1-5, the cycle characteristics were better in the order of Example 1<Example 2<Example 3<Example 4<Example 5. That is to say, the cycle characteristics were improved as the ratio of the amorphous phase increased.

Examples 6-10

A metal powder was prepared in the same manner as in Example 1 except for mixing Si and Co at a weight ratio of 63:37 (Example 6). Thus prepared Si—Co alloy was prepared into a metal powder by ball milling in the same manner as in Examples 2-5 (Examples 7-10). Then, phase analysis and battery performance evaluation were performed the same manner as in Example 1.

Comparative Example 2

A metal powder was prepared in the same manner as in Comparative Example 1 except for mixing Si and Co at a weight ratio of 63:37. Then, phase analysis and battery performance evaluation were performed the same manner as in Example 1.

Examples 11-15

A metal powder was prepared in the same manner as in Example 1 except for mixing Si and Ni at a weight ratio of 65:35 (Example 11). Thus prepared Si—Ni alloy was prepared into a metal powder by ball milling in the same manner as in Examples 2-5 (Examples 12-15) Then, phase analysis and battery performance evaluation were performed the same manner as in Example 1.

Comparative Example 3

A metal powder was prepared in the same manner as in Comparative Example 1 except for mixing Si and Ni at a weight ratio of 65:35. Then, phase analysis and battery performance evaluation were performed the same manner as in Example 1.

Examples 16-20

A metal powder was prepared in the same manner as in Example 1 except for mixing Si and Mn at a weight ratio of 61:39 (Example 16). Thus prepared Si—Mn alloy was prepared into a metal powder by ball milling in the same manner as in Examples 2-5 (Examples 17-20). Then, phase analysis and battery performance evaluation were performed the same manner as in Example 1.

Comparative Example 4

A metal powder was prepared in the same manner as in Comparative Example 1 except for mixing Si and Mn at a weight ratio of 61:39. Then, phase analysis and battery performance evaluation were performed the same manner as in Example 1.

Examples 21-25

A metal powder was prepared in the same manner as in Example 1 except for mixing Si, misch metal and Ni at a weight ratio of 57:15:28 (Example 21). Thus prepared alloy was prepared into a metal powder by ball milling in the same manner as in Examples 2-5 (Examples 22-25). Then, phase analysis and battery performance evaluation were performed the same manner as in Example 1.

Comparative Example 5

A metal powder was prepared in the same manner as in Comparative Example 1 except for mixing Si, misch metal and Ni at a weight ratio of 57:15:28. Then, phase analysis and battery performance evaluation were performed the same manner as in Example 1.

The result of phase analysis and battery performance evaluation for Examples 6-25 and Comparative Examples 2-5 is shown in Table 4.

TABLE 4

| | Ratio of amorphous phase | Electric capacity | Maintenance of capacity after 50 cycles* | Thickness increase after 50 cycles** |
|---|---|---|---|---|
| Ex. 6 | 38% | 987 mAh/g | 45% | 296% |
| Ex. 7 | 46% | 976 mAh/g | 51% | 275% |
| Ex. 8 | 49% | 969 mAh/g | 57% | 266% |
| Ex. 9 | 57% | 967 mAh/g | 59% | 242% |
| Ex. 10 | 64% | 961 mAh/g | 64% | 239% |
| Comp. Ex. 2 | 7% | 1054 mAh/g | 9% | 390% |
| Ex. 11 | 32% | 1375 mAh/g | 44% | 317% |
| Ex. 12 | 41% | 1327 mAh/g | 47% | 303% |
| Ex. 13 | 49% | 1319 mAh/g | 53% | 295% |
| Ex. 14 | 55% | 1275 mAh/g | 57% | 279% |
| Ex. 15 | 57% | 1266 mAh/g | 60% | 265% |
| Comp. Ex. 3 | 4% | 1458 mAh/g | 4% | 413% |
| Ex. 16 | 43% | 955 mAh/g | 57% | 292% |
| Ex. 17 | 71% | 947 mAh/g | 68% | 277% |
| Ex. 18 | 76% | 920 mAh/g | 71% | 268% |
| Ex. 19 | 81% | 913 mAh/g | 72% | 249% |
| Ex. 20 | 88% | 918 mAh/g | 74% | 218% |
| Comp. Ex. 4 | 13% | 985 mAh/g | 14% | 381% |
| Ex. 21 | 61% | 1032 mAh/g | 65% | 245% |
| Ex. 22 | 79% | 978 mAh/g | 69% | 228% |
| Ex. 23 | 83% | 965 mAh/g | 69% | 219% |
| Ex. 24 | 88% | 959 mAh/g | 74% | 202% |
| Ex. 25 | 94% | 952 mAh/g | 77% | 198% |
| Comp. Ex. 5 | 27% | 1100 mAh/g | 32% | 366% |

*= (Discharge capacity after 50 cycles/Discharge capacity after 1 cycle) × 100
**= (Thickness after 50 cycles-charging/Thickness before 1 cycle-charging) × 100

Evaluation Result:

In Examples 6-25, the ratio of the amorphous phase was 30% or greater. The electric capacity was superior (913-1375 mAh/g) to carbonaceous material (360 mAh/g) by 2.5 times or more. Also, maintenance of capacity (44-75%) was higher and volume expansion (198-317%) was less after 50 cycles. In particular, as the ball milling proceeded, i.e. as the ratio of the amorphous phase increased, the cycle characteristics were improved and the volume expansion was reduced.

In contrast, in Comparative Examples 2-5, the crystalline phase was the majority, with the amorphous phase only 4-27%. Although the electric capacity was superior (985-1458 mAh/g), maintenance of capacity (4-32%) was very low and volume expansion was very large (366-413%) after 50 cycles.

Accordingly, it can be seen that as the ratio of the amorphous phase increases, the cycle characteristics become satisfactory and the volume expansion becomes controllable.

Examples 26-50

Anode active materials were prepared in the same manner as in Example 1 except that the metal powders prepared in Examples 1-25 were mixed carbon at a weight ratio of 50:50. Then, phase analysis and battery performance evaluation were performed the same manner as in Example 1.

Comparative Examples 6-10

Anode active materials were prepared in the same manner as in Example 1 except that the metal powders prepared in Comparative Examples 1-5 were mixed with carbon at a weight ratio of 50:50. Then, phase analysis and battery performance evaluation were performed the same manner as in Example 1.

The result of phase analysis and battery performance evaluation for Examples 26-50 and Comparative Examples 6-10 is shown in Table 5.

TABLE 5

| | Electric capacity (mAh/g) | Maintenance of capacity after 50 cycles* | Thickness increase after 50 cycles** |
|---|---|---|---|
| Ex. 26 | 605 | 69 | 168 |
| Ex. 27 | 598 | 71 | 164 |
| Ex. 28 | 594 | 74 | 161 |
| Ex. 29 | 588 | 78 | 158 |
| Ex. 30 | 586 | 79 | 154 |
| Comp. Ex. 6 | 619 | 31 | 226 |
| Ex. 31 | 675 | 54 | 175 |
| Ex. 32 | 670 | 59 | 168 |
| Ex. 33 | 665 | 61 | 166 |
| Ex. 34 | 664 | 67 | 161 |
| Ex. 35 | 661 | 75 | 156 |
| Comp. Ex. 7 | 709 | 33 | 227 |
| Ex. 36 | 865 | 49 | 156 |
| Ex. 37 | 841 | 54 | 151 |
| Ex. 38 | 840 | 59 | 148 |
| Ex. 39 | 821 | 64 | 147 |
| Ex. 40 | 815 | 69 | 144 |
| Comp. Ex. 8 | 911 | 29 | 211 |
| Ex. 41 | 655 | 66 | 159 |
| Ex. 32 | 653 | 74 | 151 |
| Ex. 33 | 640 | 77 | 150 |
| Ex. 44 | 637 | 79 | 147 |
| Ex. 45 | 640 | 83 | 146 |
| Comp. Ex. 9 | 674 | 41 | 223 |
| Ex. 46 | 671 | 73 | 141 |
| Ex. 47 | 660 | 76 | 138 |
| Ex. 48 | 659 | 78 | 138 |
| Ex. 49 | 651 | 81 | 135 |
| Ex. 50 | 644 | 84 | 134 |
| Comp. Ex. 10 | 732 | 49 | 194 |

*= (Discharge capacity after 50 cycles/Discharge capacity after 1 cycle) × 100
**= (Thickness after 50 cycles-charging/Thickness before 1 cycle-charging) × 100

Evaluation Result:

Examples 26-50 showed superior electric capacity was (585-865 mAh/g) as compared to carbonaceous material (360 mAh/g). Also, maintenance of capacity (49-83%) was higher and volume expansion (134-168%) was less after 50 cycles.

In particular, as the ball milling proceeded, i.e. as the ratio of the amorphous phase increased, the cycle characteristics were improved and the volume expansion was reduced.

In contrast, in Comparative Examples 6-10, although the electric capacity was superior (619-911 mAh/g), maintenance of capacity (29-49%) was low and volume expansion was very large (194-227%) after 50 cycles.

In accordance with the present disclosure, an electrode exhibiting superior cycle characteristics, relatively less volume expansion and good electric capacity can be prepared by controlling the ratio of the crystalline phase and the amorphous phase in an anode active material.

While the present disclosure has been described with respect to the specific embodiments, it will be apparent to those skilled in the art that various changes and modifications may be made without departing from the spirit and scope of the disclosure as defined in the following claims.

What is claimed is:

1. An anode active material comprising:
   a crystalline phase comprising Si and a Si-metal alloy; and
   an amorphous phase comprising Si and a Si-metal alloy,
   wherein the amorphous phase is included in an amount more than 30 wt %, and
   the metal of the Si-metal alloy of the crystalline phase is the same as or different from the metal of the Si-metal alloy of the amorphous phase.

2. The anode active material according to claim 1, wherein the metal of the Si-metal alloy is one or more element selected from a group consisting of Ca, Sc, Ti, V, Cr, Mn, Fe, Co, Ni, Cu, Zn, Sr, Y, Zr, Nb, Ba, Lu, Hf, Ta and lanthanides.

3. The anode active material according to claim 1, wherein, in the Si-metal alloy of the crystalline phase and the Si-metal alloy of the amorphous phase, the metals of the alloys are the same.

4. The anode active material according to claim 1, wherein, in the Si-metal alloy of the crystalline phase and the Si-metal alloy of the amorphous phase, the metal comprises one metal species.

5. The anode active material according to claim 1, wherein, in the Si-metal alloy of the crystalline phase and the Si-metal alloy of the amorphous phase, the metal comprises two metal species.

6. The anode active material according to claim 4, wherein the metal is a metal selected from a group consisting of Co, Ni, Mn and Ti.

7. The anode active material according to claim 5, wherein the two metals comprise a metal selected from a group consisting of Ti and Zr and a metal selected from a group consisting of Co, Ni and Fe.

8. The anode active material according to claim 1, wherein, in the Si-metal alloy of the crystalline phase and the Si-metal alloy of the amorphous phase, the metal comprises one or more metal selected from rare earth elements and a metal selected from Co, Ni and Fe.

9. An electrode comprising the anode active material according to claim 1.

10. An electrode comprising the anode active material according to claim 1 and a carbonaceous anode active material.

11. A lithium secondary battery comprising the electrode according to claim 9.

12. A lithium secondary battery comprising the electrode according to claim 10.

* * * * *